No. 749,848. PATENTED JAN. 19, 1904.
J. J. DANIELS.
GOPHER TRAP.
APPLICATION FILED APR. 28, 1903.
NO MODEL.

Witnesses.
H. S. Kilgore.
A. H. Opsahl.

Inventor:
John J. Daniels.
By his Attorneys,
Williamson Merchant

No. 749,848. Patented January 19, 1904.

UNITED STATES PATENT OFFICE.

JOHN J. DANIELS, OF MINNEAPOLIS, MINNESOTA.

GOPHER-TRAP.

SPECIFICATION forming part of Letters Patent No. 749,848, dated January 19, 1904.

Application filed April 28, 1903. Serial No. 154,627. (No model.)

*To all whom it may concern:*

Be it known that I, JOHN J. DANIELS, a citizen of the United States, residing at Minneapolis, in the county of Hennepin and State of Minnesota, have invented certain new and useful Improvements in Gopher-Traps; and I do hereby declare the following to be a full, clear, and exact description of the invention, such as will enable others skilled in the art to which it appertains to make and use the same.

My invention has for its object to provide a simple and efficient trap adapted for use in catching pocket-gophers, and is especially designed as an improvement on the style of trap set forth and claimed in my prior patent, No. 703,556, of date July 1, 1902.

To the above ends the invention consists of the novel devices and combinations of devices hereinafter described, and defined in the claims.

In my said prior patent the spring-pressed jaws of the trap were set or held in positions for action by a trigger or trip-lever. In my present invention, in lieu of the trigger or trip-lever I use a string, cord, or other connection capable of being readily gnawed in two. Such connection I herein designate in a broad sense by the term "cord." The use of this cord to set the trap or prevent the jaws thereof from springing together I consider, broadly, new, whether used in the former traps disclosed in my prior patent or in any other form of trap.

The invention is illustrated in the accompanying drawings, wherein like characters indicate like parts throughout the several views.

Figure 1:
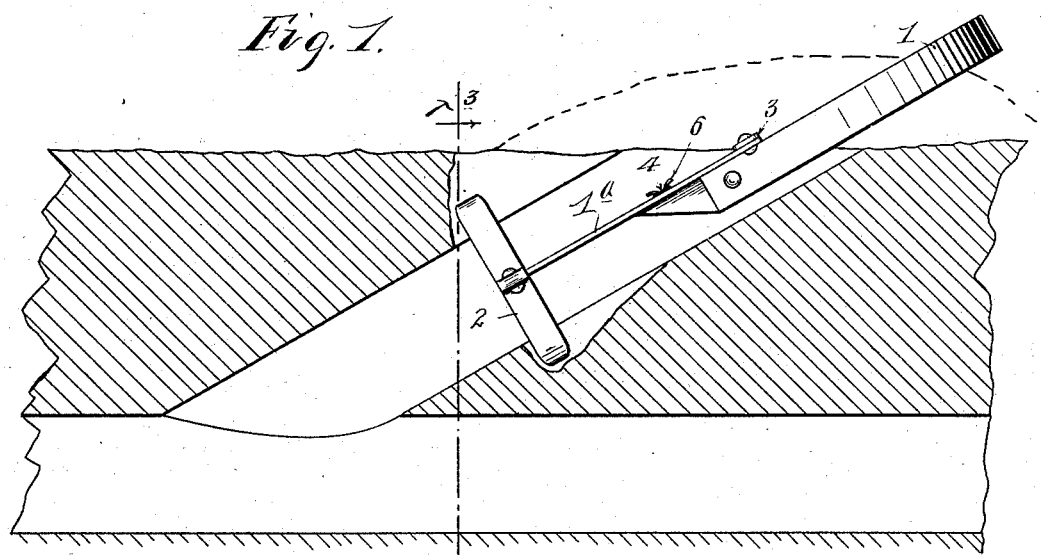
Figure 2:
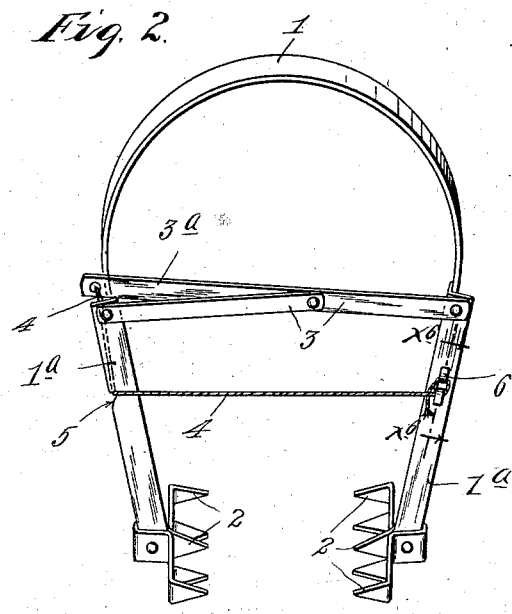
Figure 3:
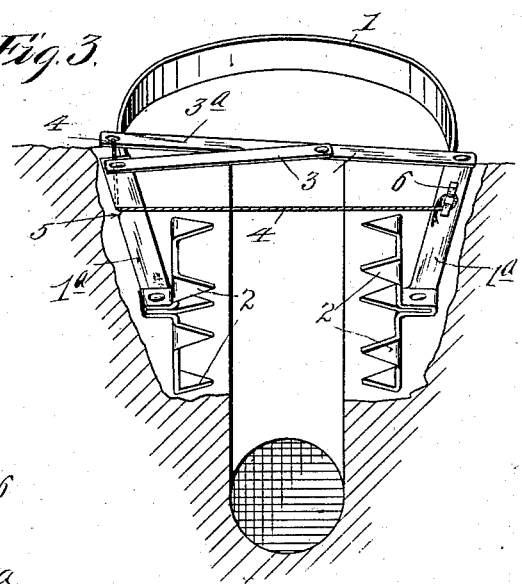
Figures 4, 5:
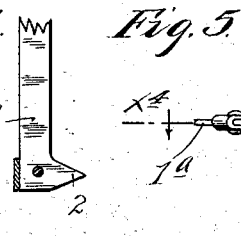
Figure 6:

Figure 1 shows the trap in side elevation and a portion of the ground and gopher-hole in section. Fig. 2 shows the trap in perspective looking at the same from the right toward the left with respect to Fig. 1. Fig. 3 shows the trap in perspective and the ground-section on the line $x^3$ $x^3$ of Fig. 1. Fig. 4 is a detail showing a portion of one of the jaws, the same being a section on the line $x^4$ $x^4$ of Fig. 5, parts of the other jaw being removed. Fig. 5 is an end elevation of the trap looking at the jaws thereof and some parts being broken away, and Fig. 6 is a detail in section on the line $x^6$ $x^6$ of Fig. 2.

The numeral 1 indicates a strong and approximately U-shaped spring, the tension of which tends to throw its free ends together with a very considerable force. At their free ends the arms of the spring 1 are provided with transversely-extended toothed heads or jaws 2. For a considerable distance inward of the heads 2 the spring 1 is formed with rigid arm-sections $1^a$, which, as shown, are formed separately therefrom and riveted or bolted thereto. These arms and the jaws of the spring 1 are adapted to be held separated by a toggle 3, the ends of which are pivoted to the arm-sections $1^a$. One member of the toggle 3 is provided with an extended trip-arm $3^a$, the free end of which, as shown, terminates near the pivot of the other toggle member when the toggle is straightened out. To the end of the trip-arm $3^a$ is attached a cord 4, which is adapted to be passed through a notch 5 in the adjacent arm $1^a$ and to be secured to a catch 6, formed on the opposite arm-section $1^a$. This catch 6 is best afforded by a pair of reversely-extended lips pressed from said arm-section, as best shown in Fig. 6.

To set the trap, the toggle 3 is straightened out, and the cord 4, being then passed into the notch 5, is tightly drawn across the space between the two arm-sections and is wound about the lips of the catch 6 until it is secured against slipping. When the toggle is thus set, it stands off from a dead-center, so that whenever the cord 4 is cut the spring 1 will buckle the said toggle and will throw the jaws 2 violently together or onto any object caught between them.

In setting the trap in a gopher-hole the mouth of the hole is dug out slightly, so that the trap is inserted in the same, approximately as shown in Figs. 1 and 3. In this position of the trap the jaws 2 stand one on each side of the hole, and the cord 4 passes diametrically across the hole.

The trap disclosed and broadly claimed in in my prior patent I have found very efficient for catching gophers; but I have observed that sometimes a gopher, being very cautious, will force a pile of dirt ahead of him onto the trap and against the trigger, thereby setting off the trap before he has come to a point between the jaws of the trap. A gopher having once sprung a trap without being caught, but simply scared, will probably never again come near enough to a trap to be caught thereby.

With the trap held set by the cord dirt pushed against the trap or against the cord will not set off the trap. Hence a gopher will proceed to clear away the dirt and coming to the cord, which stands in his way, will gnaw or bite the same in two, and thus of course spring the trap at a time when he stands between the jaws of the trap. It is a well-known fact that it is in the nature of a gopher to gnaw off any root or similar thing capable of being gnawed or severed which stands in his way, especially in his line of travel through the hole or through the ground.

I have used the trap above described and have found the same extremely efficient for the purposes had in view.

It will of course be understood that the device described is capable of modification within the scope of my invention and that, as hereinbefore stated, the tripping-cord capable of being readily gnawed or severed may be applied in a great many different ways and to traps of many different styles or types.

What I claim, and desire to secure by Letters Patent of the United States, is as follows:

1. A trap having jaws under strain to spring together, and means for holding the trap set with its jaws set, involving a cord extended from one side to the other of the trap, in the vicinity of its jaws, substantially as described.

2. A trap of the character described involving an approximately U-shaped spring having jaw-equipped arms, a toggle-link pivoted at its ends to the arms of said spring and adapted to hold the jaws separated, one member of said toggle having an extended tripping-arm, and a cord attached to said tripping-arm and adapted to be drawn taut from one arm to the other of said spring and attached to one of said arms, substantially as described.

3. The combination with the spring 1 having arm-sections 1ª provided with jaws 2, one of said arms having a notch 5 and the other having the catch 6, of the toggle 3 pivotally attached to the said arms 1ª for holding the same separated and the trap set, one member of said toggle having the trip-arm extension 3ª, and the cord 4 attached to the free end of said trip-arm and adapted to be passed through said notch 5 and secured by said catch 6, to hold the trap set, substantially as described.

In testimony whereof I affix my signature in presence of two witnesses.

JOHN J. DANIELS.

Witnesses:
ELIZABETH H. KELIHER,
F. D. MERCHANT.